(12) United States Patent
Hunt et al.

(10) Patent No.: US 12,250,438 B2
(45) Date of Patent: Mar. 11, 2025

(54) SWIR SEE-SPOT, LASER TARGET ACQUISITION, TRACKING, AND PRF DECODING NIGHTVISION SYSTEM

(71) Applicant: L3Harris Technologies, Inc., Melbourne, FL (US)

(72) Inventors: Nathanael D. Hunt, Wilsonville, AL (US); James A. LeBeau, Tempe, AZ (US); Jon D. Burnsed, Tempe, AZ (US); Joseph C. Ottney, Newmarket, NH (US)

(73) Assignee: L3HARRIS TECHNOLOGIES, INC., Melbourne, FL (US)

( * ) Notice: Subject to any disclaimer, the term of this patent is extended or adjusted under 35 U.S.C. 154(b) by 53 days.

(21) Appl. No.: 18/165,634

(22) Filed: Feb. 7, 2023

(65) Prior Publication Data
US 2024/0267603 A1    Aug. 8, 2024

(51) Int. Cl.
   *G02B 23/12*    (2006.01)
   *G02B 27/01*    (2006.01)
   *H01L 27/32*    (2006.01)
   *H04N 23/20*    (2023.01)

(52) U.S. Cl.
   CPC ............ *H04N 23/20* (2023.01); *G02B 23/12* (2013.01); *G02B 27/0101* (2013.01); *G02B 2027/0118* (2013.01); *G02B 2027/014* (2013.01)

(58) Field of Classification Search
   CPC .... H04N 23/20; G02B 23/12; G02B 27/0101; G02B 2027/0118; G02B 2027/014
   See application file for complete search history.

(56) References Cited

U.S. PATENT DOCUMENTS

| | | | | | |
|---|---|---|---|---|---|
| 4,166,213 | A | * | 8/1979 | Hoover | ............... H02M 3/3385 |
| | | | | | 315/10 |
| 5,181,013 | A | * | 1/1993 | Bagshaw | .......... G02F 1/133524 |
| | | | | | 348/E9.014 |
| 6,087,660 | A | * | 7/2000 | Morris | ..................... H01J 29/98 |
| | | | | | 250/214 VT |

(Continued)

FOREIGN PATENT DOCUMENTS

| AU | 2010276689 A1 | 12/2011 |
|---|---|---|
| WO | 2021/221991 A1 | 11/2021 |

OTHER PUBLICATIONS

Advanced image intensifier night vision system technology; 2002—Estrera; (Year: 2002).*

(Continued)

*Primary Examiner* — Luis Perez-Fuentes
(74) *Attorney, Agent, or Firm* — NIXON & VANDERHYE P.C.

(57) ABSTRACT

Extracting data in pulsed light, the method includes receiving input light at an image intensifier tube. At a power supply coupled to the image intensifier tube, current to the image intensifier tube is varied to implement automatic brightness control of the intensifier tube based on intensity of the input light received at the image intensifier tube. At a signal processor coupled to the power supply, changes in voltage or current supplied by the power supply occurring as a result of changes in the intensity of the input light to the image intensifier tube are detected. Based on the changes in voltage or current supplied by the power supply, data embedded in the input light to the image intensifier tube is extracted.

20 Claims, 7 Drawing Sheets

(56) References Cited

U.S. PATENT DOCUMENTS

| | | |
|---|---|---|
| 6,564,108 B1 * | 5/2003 | Makar .................. H05B 47/18 |
| | | 463/31 |
| 7,307,793 B2 | 12/2007 | Ottney et al. |
| 7,345,277 B2 | 3/2008 | Zhang |
| 7,576,515 B2 * | 8/2009 | Greenslade ......... H01M 50/247 |
| | | 361/679.01 |
| 7,773,202 B2 | 8/2010 | Crawford et al. |
| 9,415,745 B1 * | 8/2016 | Clemen, Jr. ............ B64D 45/00 |
| 10,721,000 B2 * | 7/2020 | Masarik ................... H05K 7/02 |
| 11,314,090 B2 | 4/2022 | Grobecker |
| 11,467,090 B1 * | 10/2022 | Gasda .................. G01N 21/255 |
| 2010/0302282 A1 | 12/2010 | Dobbie et al. |
| 2013/0070239 A1 | 3/2013 | Crawford et al. |
| 2018/0080740 A1 | 3/2018 | Ell |
| 2020/0073126 A1 | 3/2020 | Grobecker |
| 2020/0400944 A1 | 12/2020 | Burnsed et al. |
| 2021/0349301 A1 | 11/2021 | Becker et al. |

OTHER PUBLICATIONS

Delivers 3—Rangefinder to US Army—2020—L3Harris; (Year: 2020).*

European Search Report received for EP Patent Application No. 23218835.9, mailed on Jun. 5, 2024, 8 pages.

* cited by examiner

SWIR SEE-SPOT, LASER TARGET ACQUISITION, TRACKING, AND PRF DECODING NIGHTVISION SYSTEM

BACKGROUND

Background and Relevant Art

Nightvision systems allow a user to see in low-light environments without external human visible illumination. This allows for covert vision in a low-light environment to prevent flooding the environment with human visible light and/or protects the user from being detected due to causing human visible light or light that is otherwise detectable to other nightvision systems to be emitted.

Some nightvision systems function by receiving low levels of light reflected off of, or emitted from objects and providing that light to an image intensifier (sometimes referred to as $I^2$). The image intensifier has a photocathode. When photons strike the photocathode, electrons are emitted into a vacuum tube, and directed towards a microchannel plate to amplify the electrons. The amplified electrons strike a phosphor screen. The phosphor screen is typically chosen such that it emits human visible light when the amplified electrons strike the phosphor screen. The phosphor screen light emission is coupled, typically through an inverting fiber-optic, to an eyepiece where the user can directly view the illuminated phosphor screen, thus allowing the user to see the objects.

Nightvision systems may be used in conjunction with other equipment. For example, nightvision systems will often be used by individuals who concurrently use laser designators and receiver equipment associated with laser designators. For example, such laser designators may be used to identify objects to other nightvision system users. Typically such laser designators use pulsed repletion frequency (PRF) communications to convey information between a laser transmitter and an optical detector. Such information may be, for example, an identifier of the transmitter. This allows the receiver to identify who or what is being used to identify an object being identified by the laser designator.

Even though nightvision users often use nightvision systems and laser designators and receiver equipment, these system are nonetheless implemented as separate components requiring individual attention and control, individual power supplies, individual enclosures, individual display components, and other individual electronics and mechanical components.

The subject matter claimed herein is not limited to embodiments that solve any disadvantages or that operate only in environments such as those described above. Rather, this background is only provided to illustrate one exemplary technology area where some embodiments described herein may be practiced.

BRIEF SUMMARY

One embodiment illustrated herein includes a method that may be practiced in a nightvision environment. The method includes acts for extracting data in pulsed light, the method includes receiving input light at an image intensifier tube. At a power supply coupled to the image intensifier tube, current to the image intensifier tube is varied to implement automatic brightness control of the intensifier tube based on intensity of the input light received at the image intensifier tube. At a signal processor coupled to the power supply, changes in voltage or current supplied by the power supply occurring as a result of changes in the intensity of the input light to the image intensifier tube are detected. This coupled signal processor may be a separate device or integrated within the other circuitry and/or components present in the particular power supply design being used. Based on the changes in voltage or current supplied by the power supply, data embedded in the input light to the image intensifier tube is extracted.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

Additional features and advantages will be set forth in the description which follows, and in part will be obvious from the description, or may be learned by the practice of the teachings herein. Features and advantages of the invention may be realized and obtained by means of the instruments and combinations particularly pointed out in the appended claims. Features of the present invention will become more fully apparent from the following description and appended claims, or may be learned by the practice of the invention as set forth hereinafter.

BRIEF DESCRIPTION OF THE DRAWINGS

In order to describe the manner in which the above-recited and other advantages and features can be obtained, a more particular description of the subject matter briefly described above will be rendered by reference to specific embodiments which are illustrated in the appended drawings. Understanding that these drawings depict only typical embodiments and are not therefore to be considered to be limiting in scope, embodiments will be described and explained with additional specificity and detail through the use of the accompanying drawings in which.

DETAILED DESCRIPTION

Some embodiments illustrated herein implement a nightvision system with integrated pulsed light data extraction. In particular, a nightvision system is configured to extract data embedded in pulsed light. The nightvision system includes an image intensifier tube. The image intensifier tube includes a power supply coupled to the image intensifier tube. The power supply powers the image intensifier tube to allow the image intensifier tube to amplify low levels of light. Typically, a power supply for an image intensifier tube includes an oscillator circuit, a high voltage multiplier and an automatic brightness control (ABC) circuit. The ABC circuit includes a series regulator for producing a variable voltage to be supplied to the microchannel plate of the image intensifier tube. Power supply current and/or voltage levels supplied to the image intensifier tube determine the amount of amplification of the image intensifier tube. Thus, the power supply is configured to vary voltage or current to the image intensifier tube to implement automatic brightness control (ABC) for the intensifier tube based on intensity of light incident to the image intensifier tube. Thus, if brighter lights are detected that exceed a predetermined output brightness threshold, the power supply supplies less voltage than when dimmer lights (or no lights) are detected. Embodiments include a signal processor coupled to the power supply. The signal processor is configured to detect changes in voltage or current supplied by the power supply occurring as a result of changes in the intensity of the light incident to the image intensifier tube.

Thus, as laser light is incident the image intensifier tube, the automatic gain control will manage the voltage and current to be supplied to the image intensifier tube to automatically limit the output brightness to a predetermined level. Thus, in a pulsed laser light scenario, the power supply will supply a different current when a light pulse in a given laser light pulse stream is detected at the image intensifier tube than it will when no laser light is detected from the laser light pulse stream. The signal processor is further configured to extract data embedded in the light incident to the image intensifier tube by detecting changes in voltage or current supplied by the power supply. Additional details are now illustrated.

Previous systems required a camera to capture a light pulse stream and an additional signal processor to extract the data in the light pulse stream. Embodiments illustrated herein can be implemented without a camera, but rather can simply extract data based on the ABC circuitry and an associated signal processor capability, which may be implemented within the existing circuitry, thus reducing the components needed to extract light embedded data.

Figure 1:
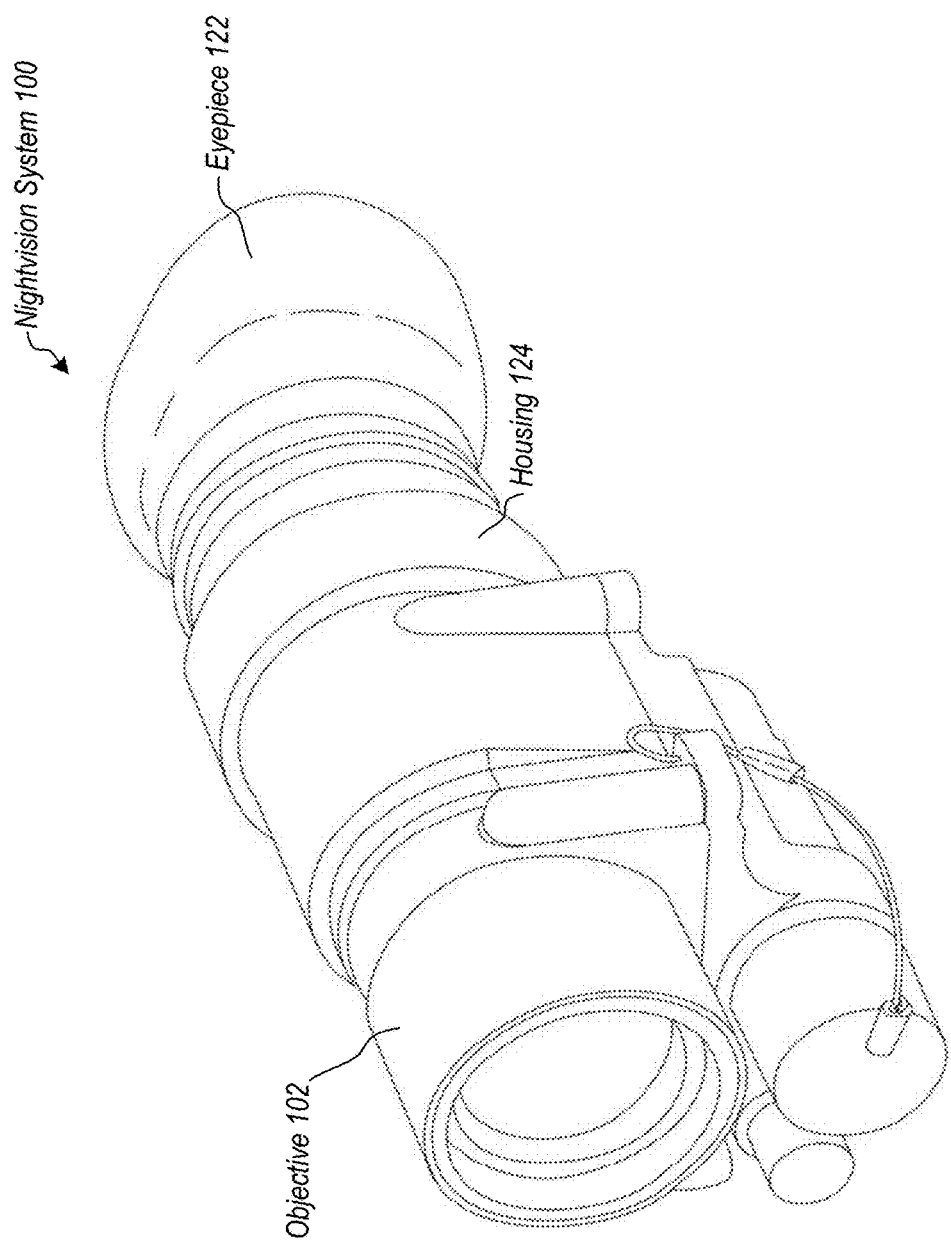
FIG. 1 illustrates a nightvision system.

Attention is now directed to FIG. 1, where a specific example of a nightvision system is illustrated. In particular, FIG. 1 illustrates the PVS-14 as the nightvision system 100. In the example illustrated, the nightvision system 100 includes a housing 124. As will be illustrated in more detail below in other figures, the housing 124 houses an image intensifier, a transparent optical device (see e.g., FIGS. 3A, 3B and 3C and transparent optical device 118), and various other components. The nightvision system 100 further includes an objective 102 which receives weak light reflected and/or generated in an environment. The objective 102 includes optics such as lenses, waveguides, and/or other optical components for receiving and transmitting light to an image intensifier, discussed in more detail below. The nightvision system 100 further includes an eyepiece 122. The eyepiece 122 includes optics for filtering images created by the nightvision system 100, including images created by an image intensifier and images created by a transparent optical device, into the eye of the user.

Figure 2:
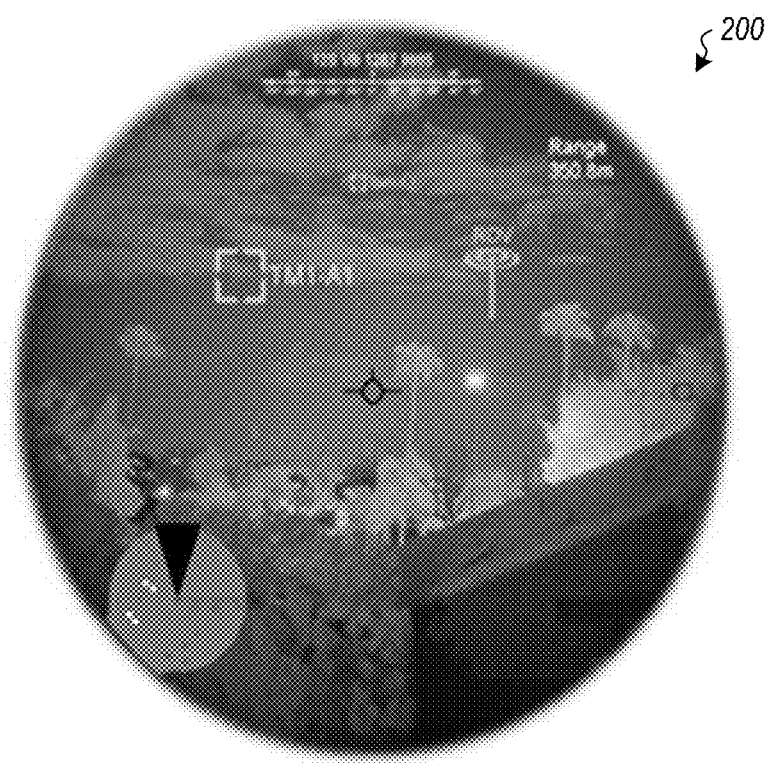
FIG. 2 illustrates a nightvision scene image with heads-up display functionality.

Modern ancillary functionality can be added to existing nightvision systems. FIG. 2 illustrates an image 200 including a heads-up display displayed on a nightvision image output from an intensifier tube. Some embodiments described herein are directed to implementing a heads-up display implemented by adding image overlay capabilities with a nightvision system, where the image overlay capabilities are added by using a transparent optical device including a display.

The heads-up display may display to the user, in or around the field-of-view of an environment, various pieces of information to create an augmented reality (AR) environment. Such information may include, for example, a navigational heading, the speed at which the user is moving, coordinates, communication messages (such as email, SMS, etc.), time of day or other timing information, vital signs for the user such as heart rate or respiration rate, indicators indicating whether an object being viewed by the nightvision system is friendly or adversarial, battery charge level for the nightvision system or other devices, weather conditions, contact information, audio information (such as volume, playlist information, artist, etc.), and so on. Note that the transparent optical device 118 (or other elements) includes photodetectors for detecting intensified light to determine brightness in a scene, the locations of various objects in the field of view (including laser designator lights), or other information. This information can be used for communication functionality, target indicators, or other images output by the transparent optical device 118.

As discussed above, in some embodiments, laser designators can be used to designate objects in a field of view. For example, a light signal emitter 150, which in the example illustrated in FIG. 1 is a laser designator. The light signal emitter 150 may be, for example, a STORM-SLX available from L3Harris of Melbourne, Florida. The light signal emitter 150 is able to emit light, such as laser light, which can be directed to an object. Often, the laser light output is modulated using a pulse repetition frequency (PRF) communications signal. The PRF communications signal can be used to identify the particular light signal emitter 150 (or a light signal emitter from a set of light signal emitter assigned to a particular group) being used. Typically, a particular PRF signal is correlated to a particular user or set of users. A typical PRF code is a 4-digit code. The codes are represented using a signal transmitted periodically according to a pulse time sometimes referred to as a beat. The pulse time may be defined, for example by a NATO STANAG or other specification. In one example, a 4-digit code is sent using the laser designator in a beat scheme where detecting three beats is typically sufficient to identify the 4-digit code. In one embodiment, the PRF is 1 Hz to 20 Hz.

In an alternative embodiment, embodiments may use pulse-position modulation (PPM) where message bits are encoded by transmitting is single pulse in a limited number of required time shifts, which is repeated over a period of time.

In yet another alternative embodiment, embodiments may vary the intensity of a light signal (e.g. amplitude modulation) to transmit multiple bits with a single pulse. Thus, data can be embedded using not only pulsing, but also intensity of pulsing.

Signals from the light signal emitter 150 can be detected and decoded as described above using the high voltage power supply and signal processor. Additional details are now illustrated.

Figure 3A:
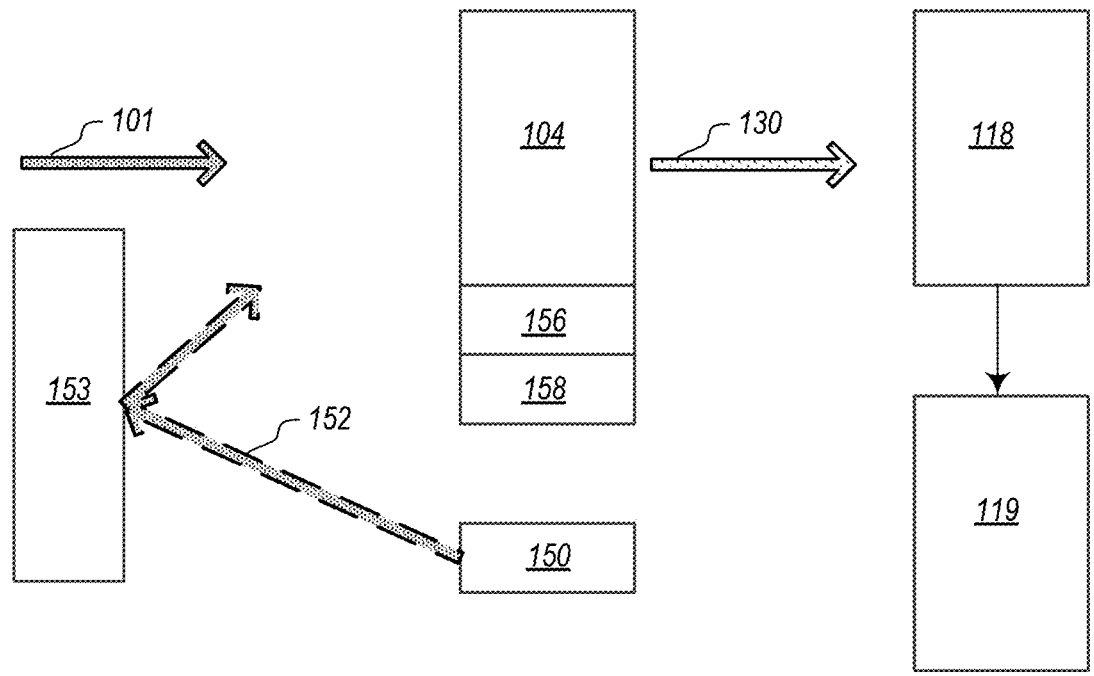
FIG. 3A illustrates a block diagram of a nightvision system including a power supply for implementing automatic brightness control, and a signal processor coupled to the power supply for extracting data embedded in light.
Figure 3B:
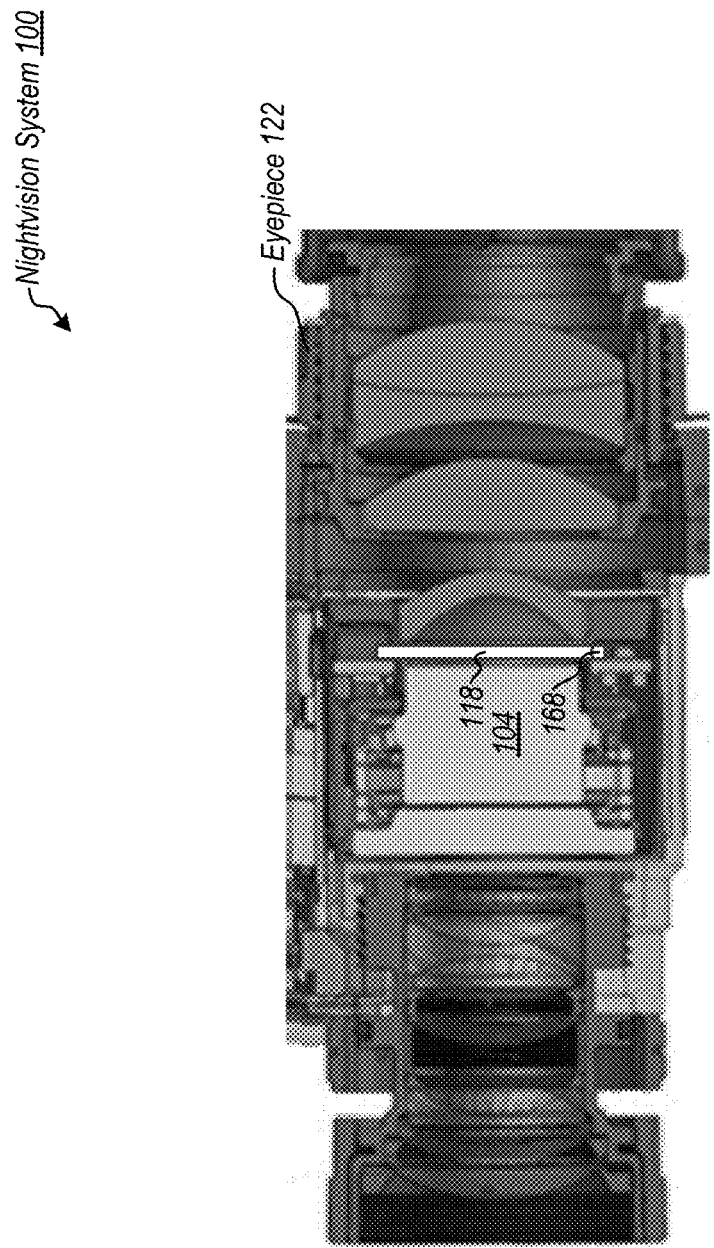
FIG. 3B illustrates a cutaway diagram of components of a nightvision system with a processor for object identification.
Figure 3C:
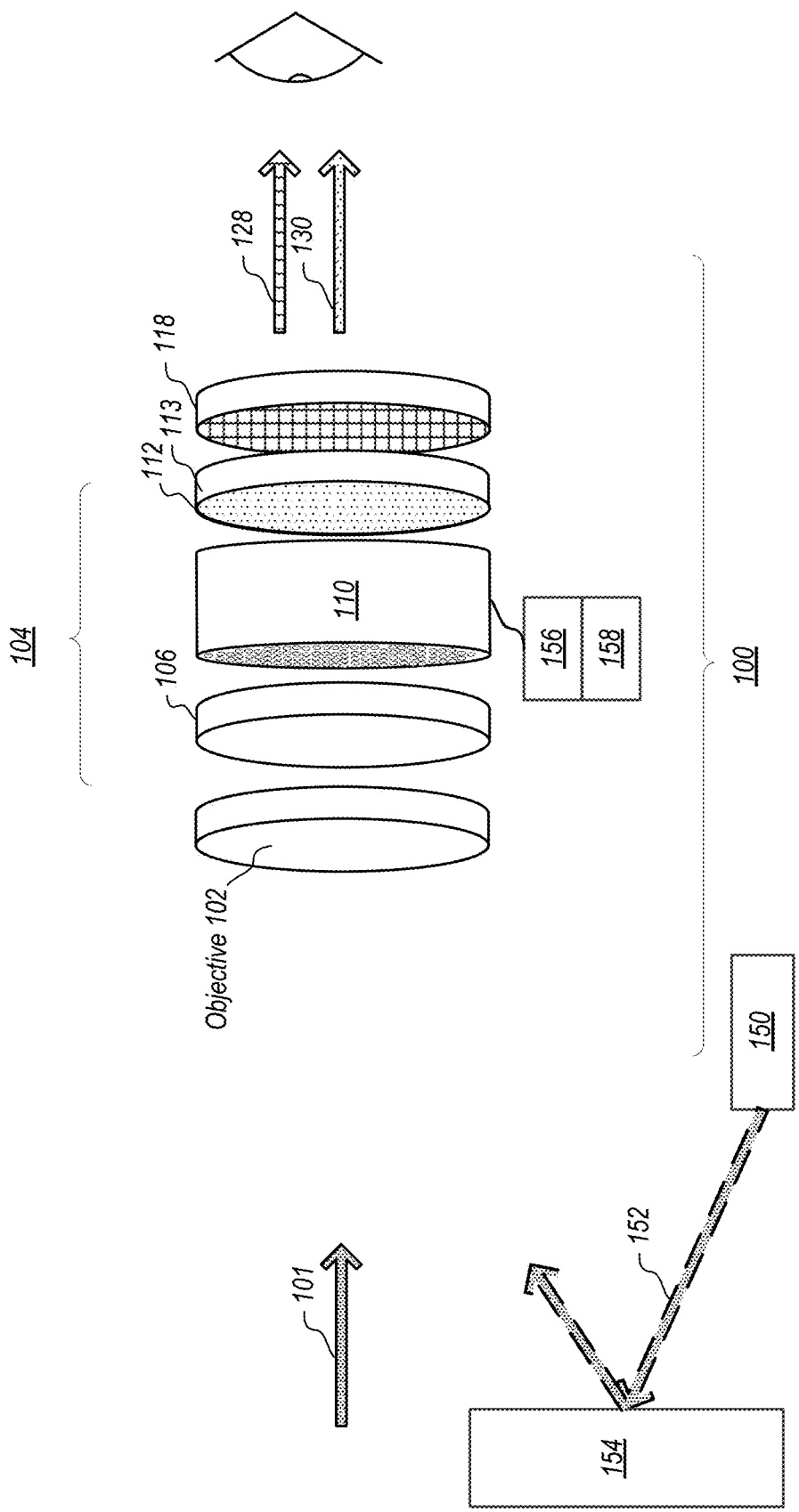
FIG. 3C illustrates a block diagram of a nightvision system including a power supply for implementing automatic brightness control, and a signal processor coupled to the power supply for extracting data embedded in light.

Attention is now directed to FIGS. 3A, 3B and 3C. FIGS. 3A, 3B and 3C illustrate a block diagram, a cutaway and a block diagram respectively of embodiments of the invention. A nightvision system typically includes an objective 102 (see FIG. 3C) to focus input light 101 into an underlying device 104. It should be appreciated that in various embodiments, the underlying device 104 may be one or more of a number of different types of nightvision devices, such as IR CCD cameras, CMOS cameras, image intensifiers, and the like. In the example illustrated in FIG. 3C, the underlying device 104 is an image intensifier. Input light 101 may be, for example, from ambient sources, such as light from heavenly bodies such as stars, the moon, or even faint light from the setting sun. Additionally, or alternatively, ambient sources could include light from buildings, automobiles, or other faint sources of light that cause reflection of light from an object being viewed in a nightvision environment into the objective.

A second source of light may be light being emitted from an external source towards an object, reflected off the object, and into the objective. For example, the source may be an infrared source that is not viewable in the viewable spectrum for human observers. In an alternative example, the light may be emitted from a light signal emitter towards an object, reflected off the object, and into the objective. An example of this is illustrated in FIG. 3A, which illustrates the light signal emitter 150 emitting a signal light 152 off of an object 153. In this example, the light signal emitter 150 is used not only to convey data, but also as an object designator. In this example, the signal light 152 is modulated, such as by using PRF or PPM, to convey information in the signal light 152.

A third source of light may be light emitted by an object itself. For example, this may be related to visible light, infrared heat energy emitted by the object and directed into the objective, etc. Nonetheless, the nightvision system is able to convert the light emitted from the source into a viewable image for the user. Note that in some embodiments, the light signal emitter 150 may be aimed directly at the nightvision system 100, rather than reflecting the signal light 152 off of an object 153.

The objective directs input light 101 (which may include signal light 152) into the underlying device 104. Note that the underlying device 104 may include functionality for amplifying light received from the objective to create a sufficiently strong image that can be viewed by the user. This may be accomplished using various technologies. In the image intensifier example of FIG. 3C, a photocathode 106, a microchannel plate 110, a phosphor screen 112, and a high voltage power supply 156 are used. The photocathode 106 may be configured to generate photo electrons in response to incoming photons. Electrons from the photocathode 106 are emitted into the microchannel plate 110. Electrons are multiplied in the microchannel plate 110.

The number of electrons produced is controlled by an input current provided by the power supply 156. As noted previously, automatic gain control is included in the power supply 156 which controls amplification (gain) of the image intensifier tube based underlying device 104. In particular, the automatic gain control will cause less current to be supplied to the underlying device 104 than when laser light is not incident the underlying device 104. Thus, in a pulsed laser light scenario, such as when the light signal emitter 150 emits a pulsed light with signal information embedded in the pulses, the power supply 156 will modulate the current when a light pulse in a given laser light pulse stream is detected at the underlying device 104 and when no laser light is detected from the laser light pulse stream, such as the signal light 152. A signal processor 158 is configured to extract data embedded in the light incident to the underlying device 104 by detecting changes in voltage or current supplied by the power supply.

The extracted data can be provided to any one of a number of different entities. For example, the extracted data can be provided to external communication equipment used by the user of the nightvision system.

In an alternative or additional example, extracted data can be provided to the image processor 168 and used in conjunction with displaying information to the user of the nightvision system using the display (illustrated in more detail below). For example, the extracted data may identify an entity associated with the light emitter 150. The signal processor can then output information to the display 120 identifying the entity associated with the light emitter.

Electrons are emitted from the microchannel plate 110 to a phosphor screen 112 which glows as a result of electrons striking the phosphor screen 112. This creates a monochrome image from the input light 101 (including the signal light 152).

A fiber-optic 113 carries this image as intensified light to the eyepiece (such as eyepiece 122 illustrated in FIG. 1) of a nightvision system where it can be output to the user. This fiber-optic 113 can be twisted 180 degrees to undo the inversion caused by the system objective to allow for convenient direct viewing of the phosphor screen 112.

FIGS. 3A, 3B and 3C further illustrate the transparent optical device 118, which may be optionally included in some embodiments. The transparent optical device 118 allows intensified light to pass through the transparent optical device 118, but also, in some embodiments, generates its own light, from LEDs or other light emitters, to transmit the generated light to a user. Creating a transparent optical device may be accomplished, for example, using the teachings of U.S. patent application Ser. No. 16/868,306, filed on May 6, 2020, titled "Backside Etch Process For Transparent Silicon Oxide Technology", which is incorporated herein by reference, in its entirety.

The transparent optical device 118 is typically implemented behind the fiber-optic 113 (i.e., closer to the eyepiece than the fiber-optic 113), but in other embodiments may be implemented in front of the fiber-optic 113. The use of a fiber-optic within nightvision systems inverts and translates the focal plane allowing the transparent optical device 118 overlay to be presented on either side without impacting the ability for the eyepiece to focus on the image. However, certain manufacturing or mechanical constraints may incentivize placement of the transparent optical device 118 behind the fiber-optic including the difficulty in inserting electronics within the vacuum package of the underlying device 104. Placing the transparent optical device 118 external to the fiber-optic can be done to allow the transparent optical device 118 to be applied to a system after the image intensifier tube has been manufactured and sealed, lowering production difficulties. As discussed above, the transparent optical device 118 may include functionality for displaying information to a user. Such information may include graphical content, including text, images, and the like. In some embodiments, the transparent optical device 118 may display in shaded monochrome. Alternatively, or additionally, the transparent optical device 118 may display in multiple colors. Alternatively, or additionally, the transparent optical device 118 may display in 1-bit monochrome. As noted previously, in some embodiments, the transparent optical device 118 may display a navigational heading, the speed at which the user is moving, coordinates, etc. Some examples of this functionality are illustrated in FIG. 2.

Note that while a single transparent optical device 118 is illustrated, in other embodiments, multiple transparent optical devices may be implemented in an optical path. For example, some transparent optical devices may emit light, while other transparent optical devices absorb and detect light. For example, as will be illustrated in more detail below, a transparent optical device may be used to detect light from the signal light 152 to identify specifically where a light signal emitter is pointing.

In the example illustrated in FIGS. 3A, 3B and 3C, the transparent optical device 118 outputs display light 128 which can be sent to the eyepiece (such as the eyepiece 122 illustrated in FIG. 1). As noted previously, the intensified light 130 is also provided to the eyepiece. Thus, an image such as that illustrated in FIG. 2 is presented to the user in the nightvision system.

The transparent optical device 118 is composed of active silicon elements, typically in a grid arrangement to implement various pixels. The active elements cause the device to have certain optical performance capabilities. Such capabilities may be one or more of abilities to output color output, output monochrome output, detect light, etc. Typically, the transparent optical device 118 is a digital detector and potentially display having a certain pixel density for the detector and potentially a display. Often, each pixel is implemented on a single active island, although in other embodiments, an island may have multiple pixels, or even only a single sub-pixel element. Each pixel may have one or more transistors controlling one or more OLED emitters (or other light emitting devices). Pixels may additionally or alternatively include light detectors. This can be useful for detecting the intensified light from the phosphor screen 112 or other optical output when other underlying devices are used. This detected light can be used to characterize an image intensifier (or other) image. For example, the detected light can be used for recording scene events. Alternatively, or additionally, the detected light can be used for improving placement of elements displayed on the heads-up display shown in FIG. 2. For example, edge detection techniques may be used using the detected light, and images generated and displayed by the transparent optical device 118 can be keyed off of these detected edges.

In any case, the transparent optical device 118 is representative of a stacked device formed in a semiconductor chip that overlaps an underlying device 104. In the case shown in FIG. 3C, the underlying device 104 is an image intensifier. The transparent optical device 118 is transparent to light in a first spectrum (according to some predefined transmission efficiency), which in this case is the visible spectrum of light output by the phosphor screen 112. That is, the transparent optical device 118 is not fully transparent due to the blocking of the active devices, but transparency referred to herein refers to at least partial transparency according to some transmission efficiency. Note that overlapping as used herein means that elements are in the same optical path. This can be accomplished by having elements be in coaxial alignment when the optical path is straight. Alternatively, this can be accomplished by using various waveguides or other elements to align optical paths thus not requiring physical coaxial alignment.

A photodetector implemented in the transparent optical device absorbs a portion of the intensified light converting it to electrical signals. For example, the photodetector can be a two-dimensional array of light detectors, such as photodiodes, that generates charge currents, or any other form of digital data level proportional to intensity of the intensified light as a function of position. Accordingly, the photodetector may generate a two-dimensional array of electrical charge that represents the intensified image. In some embodiments, this two-dimensional array of electrical charge can be periodically read from the photodetector (e.g., the detected signal can be read from the photodetector in a fashion similar to a charged coupled device (CCD) camera). In some embodiments, the two-dimensional array of electrical signals from the photodetector is processed (such as by the image processor 168) and/or used locally, e.g., within the transparent optical device 118, at the readout or pixel levels, to modulate in real time the amplitude of the display light 128 emitted from the transparent optical device 118.

As illustrated in FIG. 3C, intensified light is transmitted through the transparent optical device 118 to the eyepiece of the nightvision system, and then to the user. Note, however, that the intensified light is transmitted to the user through the transparent optical device 118, meaning that the intensified light will be affected by characteristics of the transparent optical device 118. In the example illustrated in FIG. 3C, light 128 represents the light output by the light emitting portions of the transparent optical device 118. Light 130 represents intensified light from the phosphor screen 112 transmitted through the transparent optical device 118. That is, light 130 may include or may be, in its entirety, light in the first spectrum.

In the example illustrated in FIG. 3C, light 101 is input into the objective 102, where it is transmitted to an underlying device 104, in this case, an image intensifier. FIGS. 3A, 3B and 3C further illustrate the transparent optical device 118. As noted previously, the transparent optical device 118 includes light detectors that are able to detect light produced by the underlying device 104 to produce a feature map. The feature map indicates features identified in different portions of a scene. In particular, analysis of the feature map can show features detected in a scene detected by the underlying device 104.

FIGS. 3A, 3B and 3C further illustrate an image processor 168. The image processor 168 is able to create and/or process feature maps from features detected by the detectors in the transparent optical device 118. In particular, the image processor 168 can analyze and identify points, edges, shapes, etc. in the feature map.

Thus, embodiments include a nightvision system 100. The nightvision system 100 includes an underlying device 104. For example, an image intensifier is an example of an underlying device. Note that other underlying devices may be used in addition or alternatively. For example, some embodiments may include infrared CCD based or other low light level digital sensor system. The underlying device 104 is configured to provide output light in a first spectrum from input light received at the underlying device 104. Thus, for example, the first spectrum may be light produced by the phosphor screen 112.

The nightvision system 100 includes a transparent optical device, such as transparent optical device 118, optically coupled in an overlapping fashion to the underlying device 104. The transparent optical device 118 is configured to transmit light in the first spectrum from the underlying device 104 through the transparent optical device 118. The transparent optical device 118 includes: an active area of a semiconductor chip.

The active area includes a plurality of active elements configured to cause the underlying device 104 to detect light from the underlying device 104. For example, as described above, light detectors integrated into a photodetector may be used to detect light from the underlying device 104.

The transparent optical device 118 further includes a plurality of transparent regions formed in the active area which are transparent to the light in the first spectrum to allow light in the first spectrum to pass through from the underlying device 104 to a user. The transparent regions are configured in size and shape to cause the transparent optical device 118 to have a particular transmission efficiency for light in the first spectrum.

Figure 3D:
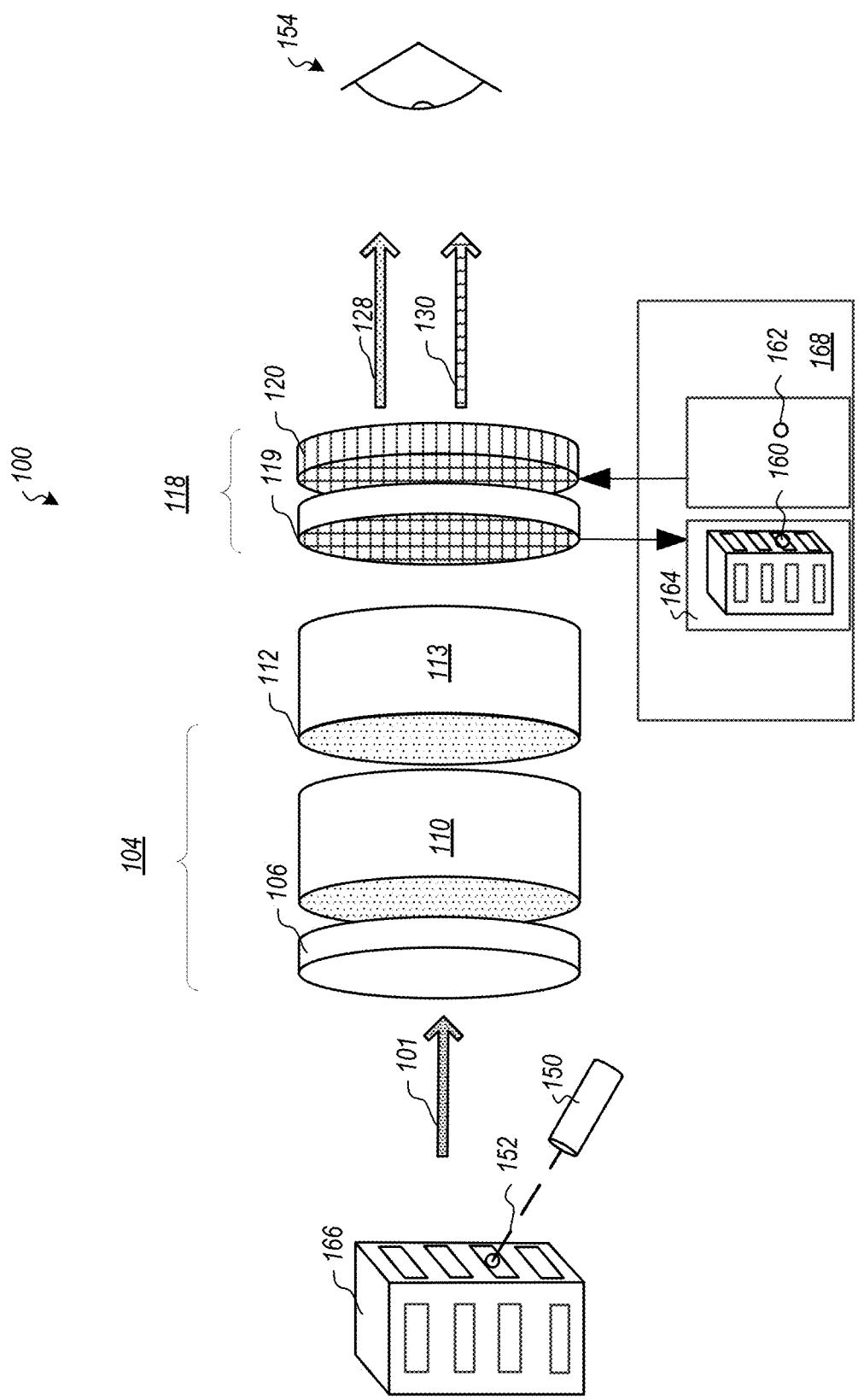
FIG. 3D illustrates a block diagram of a nightvision system including a signal processor for identifying objects in a nightvision scene.

Referring now to FIG. 3D, a particular example is further illustrated. FIG. 3D illustrates that the nightvision system 100 includes the underlying device 104. As discussed above, the underlying device 104 is configured to provide output light 128 in a first spectrum from input light 101 received at the underlying device 104.

The optical system includes a transparent optical device 118 optically coupled in an overlapping fashion to the underlying device 104. The transparent optical device 118 is configured to transmit light in the first spectrum from the underlying device 104 through the transparent optical device 118 to display a scene to a user.

The transparent optical device 118 includes a set of detector active elements formed in an active area of the transparent optical device 118 configured to cause the transparent optical device 118 to detect light portraying at least a portion of the scene. Thus, for example, the photodetector 119 includes detector elements that detect the scene from light output by the underlying device 104 and provides detected scene information 164 to an image processor 168.

The transparent optical device 118 further includes a set of transparent regions formed in the active area which are transparent to the light in the first spectrum to allow light in the first spectrum to pass through from the underlying device 104 to a user 154.

The nightvision system 100 includes the image processor 168. The image processor 168 is configured to process images produced using light detected by the detector active elements to identify a specific instance of light in the scene. In the example illustrated in FIG. 3D, the specific instance of light 160 is signal light 152 from the light emitter 150 reflected off of a building 166.

The image processor 168 is configured to cause display elements in the display 120 in the active area of the transparent optical device 118 to display an indicator 162, in the scene, to the user, correlated to the specific instance of light, including during a change in the scene. In particular, the indicator 162 is correlated to the specific instance of light 160. The image processor 168 is able to correlate the indicator 162 in output to the transparent display 120 with objects, orientations, and/or locations in the scene.

The image processor can correlate the indicator to specific locations and objects in the scene. For example, the image processor 168 can detect objects in the scene using the detector active elements. For example, the detected scene information 164 may be used along with edge detection algorithms to identify specific objects, such as the building 166, in the scene.

Note further that some embodiments can display multiple indicators analogous to indicator 162 at the same time. This may be due to multiple light signal emitters being used or for other reasons. As discussed above, multiple different light pulse streams, and therefore data streams can be detected. In some embodiments, the image processor 168 can be used in conjunction with the signal processor 158 to match data streams with different entities.

Figure 4:
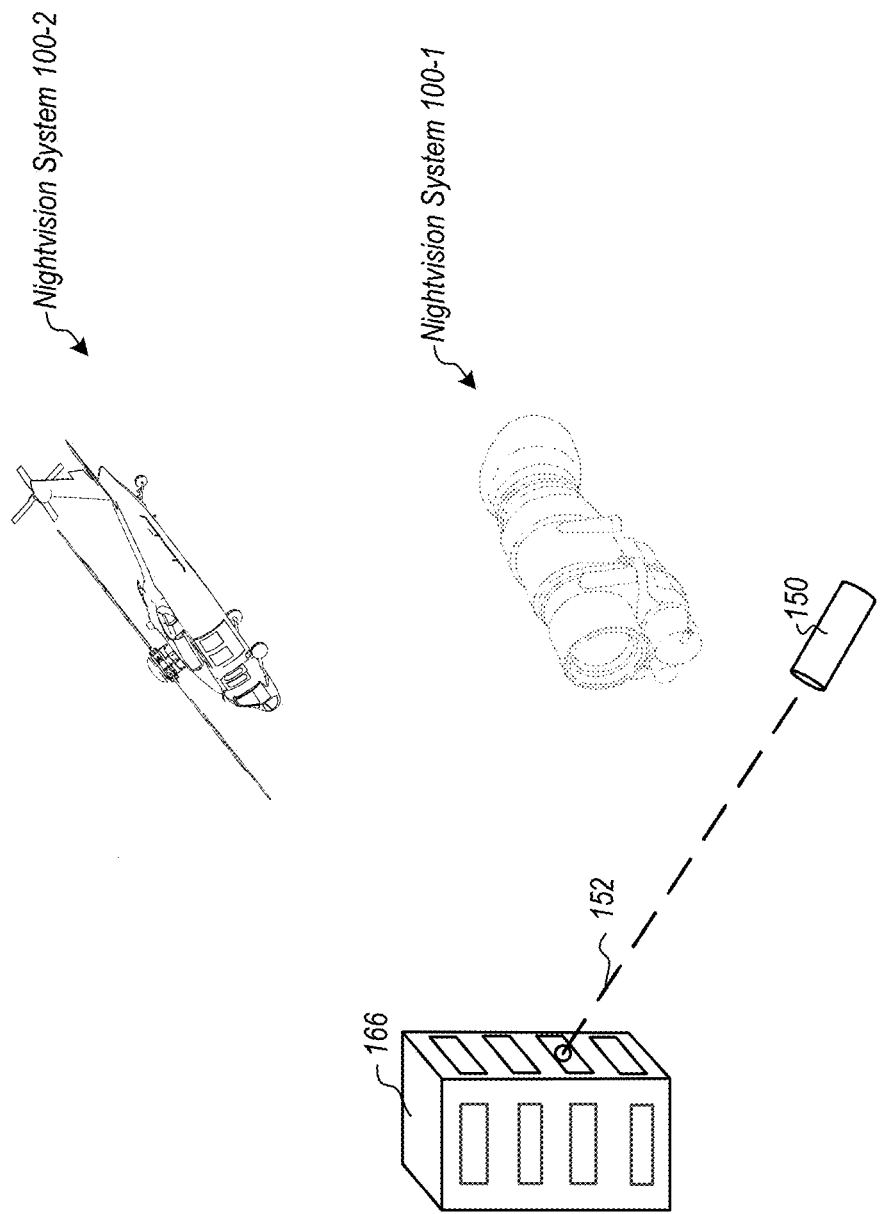
FIG. 4; illustrates an example of multiple nightvision systems working in concert.

Referring now to FIG. 4, another use case is illustrated. In FIG. 4, two nightvision systems 100-1 and 100-2 are illustrated. Each of these systems includes power supplies and signal processors similar to power supply 156 and signal processor 158, respectively. In the example illustrated, the light signal emitter 150 may be used to mark an object, such as by laser painting the object. The light signal emitter 150 can emit a light stream with data embedded in the light stream as indicated above. By each of the nightvision systems 100-1 and 100-2 including light data extraction functionality as illustrated herein, the nightvision systems can hand off objects to each other. Thus, for example, if the user of the ground based nightvision system 100-1 is first charged with observing and characterizing an object that is being designated by the light signal emitter 150, once the user at the nightvision system 100-1 has confirmed the object, based on data extracted from the signal light 152, then the user can communicate with the airborne nightvision system 100-2 to confirm certain characteristics about the object. That is, the user at the nightvision system 100-1 may be able to visually observe certain characteristics of the object that are not observable by the nightvision system 100-2. However, both nightvision systems are able to generally observe the same object and to know that the same object is being observed as a result of both nightvision systems being able to extract the same data from the signal light 152.

The following discussion now refers to a number of methods and method acts that may be performed. Although the method acts may be discussed in a certain order or illustrated in a flow chart as occurring in a particular order, no particular ordering is required unless specifically stated, or required because an act is dependent on another act being completed prior to the act being performed.

Figure 5:
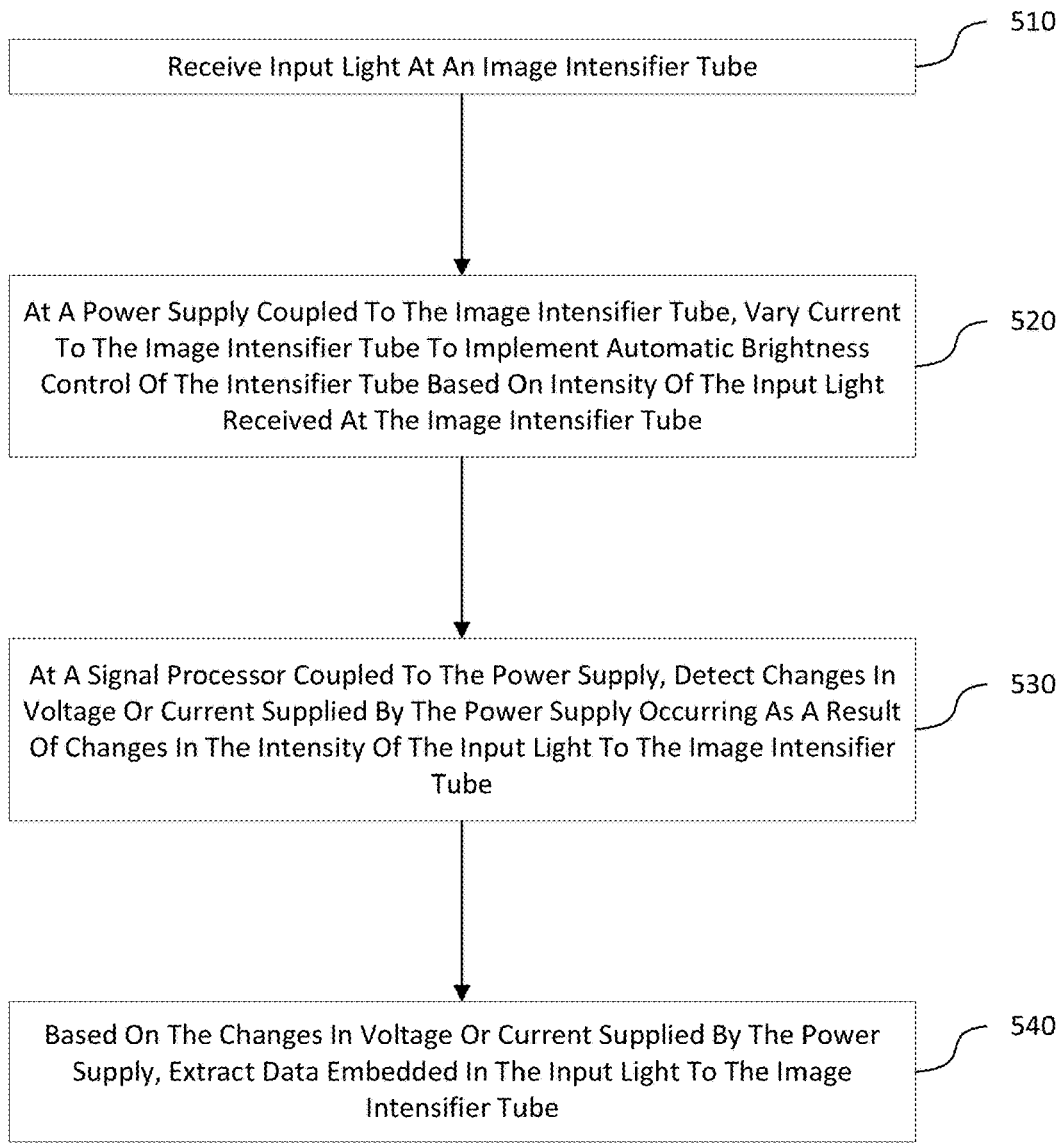
FIG. 5 illustrates a method of extracting data in pulsed light.

Referring now to FIG. 5, a method 500 is illustrated. The method 500 includes acts for extracting data in pulsed light. The method 500 includes receiving input light at an image intensifier tube (act 510).

The method 500 further includes, at a power supply coupled to the image intensifier tube, varying current to the image intensifier tube to implement automatic brightness control of the intensifier tube based on intensity of the input light received at the image intensifier tube (act 520).

The method 500 further includes, at a signal processor capability coupled to or otherwise embedded within the power supply, detecting changes in voltage or current supplied by the power supply occurring as a result of changes in the intensity of the input light to the image intensifier tube (act 530).

The method 500 further includes, based on the changes in voltage or current supplied by the power supply, extracting data embedded in the input light to the image intensifier tube (act 540).

The method 500 may be practiced where the input light to the image intensifier tube comprises laser light emitted by an object designator, the laser light emitted by the object designator comprising a pulsed code to identify the laser light as a specific instance of an object designator emission. Thus, for example, the light signal emitter 150 may be used as an object designator to emit light with data encoded in the light at an object 153.

The method 500 may further include using the extracted data, determining that at least a portion of the input light to the image intensifier tube comprises laser light emitted by an object designator associated spatially with a nightvision system which includes the image intensifier tube, power supply, and signal processor. Thus, for example, the light signal emitter 150 may be mounted on a system that includes the underlying device 104, the power supply 156 and the signal processor 158. In some embodiments, this may be used so that a user can identify signal light that they are personally emitting from a system they are using.

The method 500 may be practiced where the intensifier tube is short wave infrared (SWIR) sensitive. This may be particularly useful in situations where other wavelengths of light would cause reflections or other deleterious consequences.

The method 500 may further include, at an image detector optically coupled to the intensifier tube, detecting output light, in a spatial fashion, output from the intensifier tube; and at an image processor coupled to the image detector, detecting location of specific light in the light incident to the image intensifier tube. In some such embodiments, the method may be practiced where the image detector passes at least a portion of the output light from the intensifier tube to an eyepiece of the nightvision system. Examples of this are illustrated by the system shown in FIG. 3C.

The method 500 may be practiced where the signal processor extracts data embedded in the light incident to the image intensifier tube by applying a fast Fourier transform (FFT) such that the signal processor is configured to extract a plurality of data signals from the light incident to the image intensifier tube. For example, this may be performed when multiple different light pulses with different signal streams are used. A fast Fourier transform can be used to identify the different signals at different frequencies and signal processing can be done to extract data from the different signals at different frequencies.

Further, the methods may be practiced by a computer system including one or more processors and computer-readable media such as computer memory. In particular, the computer memory may store computer-executable instructions that when executed by one or more processors cause various functions to be performed, such as the acts recited in the embodiments.

Embodiments of the present invention may comprise or utilize a special purpose or general-purpose computer including computer hardware, as discussed in greater detail below. Embodiments within the scope of the present invention also include physical and other computer-readable media for carrying or storing computer-executable instructions and/or data structures. Such computer-readable media can be any available media that can be accessed by a general purpose or special purpose computer system. Computer-readable media that store computer-executable instructions are physical storage media. Computer-readable media that carry computer-executable instructions are transmission media. Thus, by way of example, and not limitation, embodiments of the invention can comprise at least two distinctly different kinds of computer-readable media: physical computer-readable storage media and transmission computer-readable media.

Physical computer-readable storage media includes RAM, ROM, EEPROM, CD-ROM or other optical disk storage (such as CDs, DVDs, etc.), magnetic disk storage or other magnetic storage devices, or any other medium which can be used to store desired program code means in the form of computer-executable instructions or data structures and which can be accessed by a general purpose or special purpose computer.

A "network" is defined as one or more data links that enable the transport of electronic data between computer systems and/or modules and/or other electronic devices. When information is transferred or provided over a network or another communications connection (either hardwired, wireless, or a combination of hardwired or wireless) to a computer, the computer properly views the connection as a transmission medium. Transmissions media can include a network and/or data links which can be used to carry desired program code means in the form of computer-executable instructions or data structures and which can be accessed by a general purpose or special purpose computer. Combinations of the above are also included within the scope of computer-readable media.

Further, upon reaching various computer system components, program code means in the form of computer-executable instructions or data structures can be transferred automatically from transmission computer-readable media to physical computer-readable storage media (or vice versa). For example, computer-executable instructions or data structures received over a network or data link can be buffered in RAM within a network interface module (e.g., a "NIC"), and then eventually transferred to computer system RAM and/or to less volatile computer-readable physical storage media at a computer system. Thus, computer-readable physical storage media can be included in computer system components that also (or even primarily) utilize transmission media.

Computer-executable instructions comprise, for example, instructions and data which cause a general purpose computer, special purpose computer, or special purpose processing device to perform a certain function or group of functions. The computer-executable instructions may be, for example, binaries, intermediate format instructions such as assembly language, or even source code. Although the subject matter has been described in language specific to structural features and/or methodological acts, it is to be understood that the subject matter defined in the appended claims is not necessarily limited to the described features or acts described above. Rather, the described features and acts are disclosed as example forms of implementing the claims.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, pagers, routers, switches, and the like. The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (ASICs), Application-specific Standard Products (ASSPs), System-on-a-chip systems (SOCs), Complex Programmable Logic Devices (CPLDs), etc.

The present invention may be embodied in other specific forms without departing from its characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A nightvision system configured to extract data in pulsed light, the nightvision system comprising:
    an image intensifier tube;

a power supply coupled to the image intensifier tube, the power supply configured to vary current to the image intensifier tube to implement automatic brightness control of the intensifier tube based on intensity of light incident to the image intensifier tube; and a signal processor coupled to the power supply, the signal processor configured to:

detect changes in voltage or current supplied by the power supply occurring as a result of changes in the intensity of the light incident to the image intensifier tube; and extract data encoded in the light by varying the intensity of the light, incident to the image intensifier tube.

2. The nightvision system of claim 1 wherein the light incident to the image intensifier tube comprises laser light emitted by an object designator, the laser light emitted by the object designator comprising a pulsed code to identify the laser light as a specific instance of an object designator emission.

3. The nightvision system of claim 1 further comprising an object designator configured to emit laser light, the laser light comprising a pulsed code to identify the laser light as a specific instance of an object designator emission.

4. The nightvision system of claim 1, wherein the intensifier tube is SWIR sensitive.

5. The nightvision system of claim 1, further comprising:
an image detector optically coupled to the intensifier tube, and configured to detect output light, in a spatial fashion, output from the intensifier tube; and
an image processor coupled to the image detector, the image processor configured to detect location of specific light in the light incident to the image intensifier tube.

6. The nightvision system of claim 5, wherein the image detector comprises a transparent optical device configured to pass at least a portion of the output light from the intensifier tube to an eyepiece of the nightvision system.

7. The nightvision system of claim 1, wherein the signal processor is configured to extract data encoded in the light incident to the image intensifier tube by applying a fast Fourier transform such that the signal processor is configured to extract a plurality of data signals from the light incident to the image intensifier tube.

8. A method of extracting data in pulsed light in a nightvision system, the method comprising:
receiving input light at an image intensifier tube;
at a power supply coupled to the image intensifier tube, varying current to the image intensifier tube to implement automatic brightness control of the intensifier tube based on intensity of the input light received at the image intensifier tube;
at a signal processor coupled to the power supply, detecting changes in voltage or current supplied by the power supply occurring as a result of changes in the intensity of the input light to the image intensifier tube; and
based on the changes in voltage or current supplied by the power supply, extracting data encoded in the input light, by varying the intensity of the input light, to the image intensifier tube.

9. The method of claim 8, wherein the input light to the image intensifier tube comprises laser light emitted by an object designator, the laser light emitted by the object designator comprising a pulsed code to identify the laser light as a specific instance of an object designator emission.

10. The method of claim 8, further comprising using the extracted data, determining that at least a portion of the input light to the image intensifier tube comprises laser light emitted by an object designator associated spatially with the nightvision system which includes the image intensifier tube, power supply, and signal processor.

11. The method of claim 8, wherein the intensifier tube is SWIR sensitive.

12. The method of claim 8, wherein, further comprising:
at an image detector optically coupled to the intensifier tube, detect output light, in a spatial fashion, output from the intensifier tube; and
at an image processor coupled to the image detector, detecting location of specific light in the light incident to the image intensifier tube.

13. The method of claim 12, wherein the image detector passes at least a portion of the output light from the intensifier tube to an eyepiece of the nightvision system.

14. The method of claim 8, wherein the signal processor extracts data encoded in the light incident to the image intensifier tube by applying a fast Fourier transform such that the signal processor is configured to extract a plurality of data signals from the light incident to the image intensifier tube.

15. A system for extracting data in pulsed light in a nightvision system, the system comprising:
one or more processors; and
one or more computer-readable media having stored thereon instructions that are executable by the one or more processors to configure the computer system to extract data from pulsed light, including instructions that are executable to configure the computer system to perform at least the following:
detect changes in voltage or current supplied by a power supply coupled to an image intensifier tube, occurring as a result of changes in intensity of input light to the image intensifier tube; and
based on the changes in voltage or current supplied by the power supply, extract data encoded in the input light, by varying the intensity of the input light, to the image intensifier tube.

16. The system of claim 15, wherein the input light to the image intensifier tube comprises laser light emitted by an object designator, the laser light emitted by the object designator comprising a pulsed code to identify the laser light as a specific instance of an object designator emission.

17. The system of claim 15, wherein the one or more computer-readable media further have stored thereon instructions that are executable by the one or more processors to configure the computer system to use the extracted data to determine that at least a portion of the input light to the image intensifier tube comprises laser light emitted by an object designator associated spatially with the nightvision system which includes the image intensifier tube, power supply, and signal processor.

18. The system of claim 15, wherein the intensifier tube is SWIR sensitive.

19. The system of claim 15 wherein the one or more computer-readable media further have stored thereon instructions that are executable by the one or more processors to configure the computer system to detect location of specific light in light incident to the image intensifier tube.

20. The system of claim 15 wherein the one or more computer-readable media further have stored thereon instructions that are executable by the one or more processors to configure the computer system to extract data encoded in light incident to the image intensifier tube by applying a fast Fourier transform so as to extract a plurality of data signals from the light incident to the image intensifier tube.

* * * * *